(12) United States Patent
Knospe et al.

(10) Patent No.: US 10,499,195 B1
(45) Date of Patent: Dec. 3, 2019

(54) VISUALIZATION OF SPATIAL MOTION ACTIVITIES FOR E-FORENSICS

(71) Applicant: SAP SE, Walldorf (DE)

(72) Inventors: Holger Knospe, Malsch (DE); Udo Klein, Nussloch (DE); Lukas Melzer, Bretten (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/114,909

(22) Filed: Aug. 28, 2018

(51) Int. Cl.
| | |
|---|---|
| H04W 4/029 | (2018.01) |
| H04W 4/02 | (2018.01) |
| G06F 16/29 | (2019.01) |
| G06F 3/0484 | (2013.01) |

(52) U.S. Cl.
CPC ......... *H04W 4/029* (2018.02); *G06F 16/29* (2019.01); *H04W 4/027* (2013.01); *G06F 3/04847* (2013.01)

(58) Field of Classification Search
CPC .......... G06F 16/29; G01S 5/00; H04W 4/023; H04W 4/029; H04W 4/027
See application file for complete search history.

(56) References Cited

U.S. PATENT DOCUMENTS

| | | | |
|---|---|---|---|
| 9,854,397 B1 * | 12/2017 | Melson | G06Q 50/265 |
| 2014/0358409 A1 * | 12/2014 | Khoe | G08G 1/13 |
| | | | 701/117 |
| 2016/0239752 A1 | 8/2016 | Wang et al. | |

OTHER PUBLICATIONS

Flightradar24 home page, www.flightradar24.com, visited May 30, 2018, 1 page.
"How it works," www.flightradar24.com, visited May 30, 2018, 8 pages.
"Google Maps," www.google.com/maps, visited May 30, 2018, 1 page.
Hernandez-Cumplido, "Tempo-Spatial Dynamics of Adult Plum Curculio Based on Semiochemical-Bated Trap Captures in Blueberries," Environmental Entomology, Jan. 2017, pp. 1-11, 11 pages.
"Geovisualization," *Wikipedia*, www.wikipedia.org, visited May 30, 2018, 5 pages.
Wang, "Spatial Temporal Data Visualization in Emergency Management: A view from data-driven decision," ACM EM-GIS '17, Nov. 7-10, 2017, https://doi.org/10.1145/3152465.3152473, 7 pages.
Hengl et al., "plotKML: Scientific Visualization of Spatio-Temporal Data," Journal of Statistical Software, Jan. 2015, 25 pages.

(Continued)

*Primary Examiner* — Omeed Alizada
(74) *Attorney, Agent, or Firm* — Klarquist Sparkman, LLP

(57) ABSTRACT

Location information for a plurality of target subjects can be depicted as a plurality of routes with indications of respective contemporaneous locations of the target subjects at a point in time. A graphical slider can be used to update the visualization to depict contemporaneous locations of the target subjects at a different point in time. A point on one of the routes can be activated to update the visualization to depict contemporaneous locations of the target subjects at a different point in time. Metrics for characteristics of the location data can be displayed proximate the slider. Other features provide a user interface that allows for a rich set of visualization functionality.

20 Claims, 14 Drawing Sheets

(56) References Cited

OTHER PUBLICATIONS

Elmes, "Forensic GIS: The Role of Geospatial Technologies for Investigating Crime and Providing Evidence," http://pages.geo.wvu.edu/~elmes/geospatialbook/topics.pdf, visited May 30, 2018, 2 pages.

Rossy, "Spatiotemporal Analysis of Forensic Case Data: A Visualization Approach," ResearchGate, Jan. 2013, 13 pages.

\* cited by examiner

800

850

VISUALIZATION OF SPATIAL MOTION ACTIVITIES FOR E-FORENSICS

FIELD

The field generally relates to data visualization and more particularly to location data visualization, including digital maps.

BACKGROUND

Visualization of a single location on a map can be achieved by simply calling attention to a particular single point on the map corresponding to the location. Similarly, visualization of a single route can be achieved by showing a path on the map.

However, more complex scenarios quickly overwhelm conventional technologies. For example, when presented with location data of multiple moving objects with multiple routes, a conventional map becomes overcrowded with lines, points, and other data. Although it is possible to incorporate a time element, traditional temporal-spatial visualizations can be confusing and difficult to understand.

There thus remains a need to improve visualization of location data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, computing system comprises an output device configured to display, via a user interface, an interactive chart comprising a graphical slider and a plurality of visual representations of different routes, the routes depicting respective time series of geographical locations traveled by target subjects according to a plurality of geographical location records, wherein the output device is further configured to display, for the routes, respective graphical indicators of contemporaneous locations of target subjects at a first point in time; and a processor configured to detect activation of the graphical slider, and in response to the activation of the graphical slider, calculate a second point in time, and display the graphical indicators of the contemporaneous locations of the target subjects at the second point in time on a modified version of the interactive chart.

In another embodiment, a computer-implemented method comprises, for a plurality of location records indicating geographical locations for a plurality of target subjects, displaying a visualization of the location records, wherein the visualization visually depicts a plurality of routes traveled by the target subjects and visually depicts contemporaneous locations of the target subjects at a first point in time; displaying a graphical slider with the visualization; and responsive to movement of the graphical slider, calculating a second point in time, and depicting the contemporaneous locations of the target subjects at the second point in time on a modified version of the visualization.

In another embodiment, a system comprises one or more processors; memory coupled to the one or more processors comprising instructions causing the one or more processors to perform the following when executed: for a plurality of location records indicating geographical locations for a plurality of target subjects, displaying a visualization of the location records, wherein the visualization visually depicts a plurality of routes traveled by the target subjects and visually depicts contemporaneous locations of the target subjects at a first point in time; receiving an activation of a particular location on a given one of the plurality of routes; responsive to activation of the particular location of the given one of the plurality of routes, determining a second point in time at which a target subject was at the particular location of the given one of the plurality of routes; and depicting the contemporaneous locations of the target subjects at the second point in time on a modified version of the visualization.

In another embodiment, one or more computer-readable media have encoded thereon computer-executable instructions causing one or more processors to perform a method comprising: for a location information indicating geographical locations for a plurality of monitored target subjects, displaying a visualization of the location information, wherein the visualization visually depicts a plurality of routes traveled by the monitored target subjects on a two-dimensional map and visually depicts contemporaneous geographical locations of the monitored target subjects at a first point in time; displaying a plurality of lines indicating time extents of location data availability for the monitored target subjects as stacked parallel lines, wherein at least two of the lines contain portions that overlap, indicating an overlapping availability of location data at an overlapping point in time; displaying a graphical slider on an axis having a same scale as the time extents of location data; receiving user input moving the graphical slider to a different position; based on the user input, calculating a second point in time; determining where on the two-dimensional map the monitored target subjects were at the second point of time according to the location information; and updating the two-dimensional map accordingly.

The foregoing and other objects, features, and advantages will become more apparent from the following detailed description, which proceeds with reference to the accompanying figures.

DETAILED DESCRIPTION

Example 1—Overview

Traditional temporal-spatial visualizations quickly become unwieldy as the number of routes increases. Still further, clutter in the visualization leaves little room for additional information that could be helpful to accompany the visualization.

As described herein, a variety of technologies can be used to visualize spatial motion of multiple target subjects. For example, a graphical slider can be used to navigate through the data in time (e.g., to change the being-depicted time of the visualization). Another feature allows activate-route-point navigation throughout the data. As described herein, the features can be combined.

A variety of other features can be used to show time extents of time data, graphical representations of characteristic metrics, and the like.

Such tools can be helpful in an e-forensics context, and particularly when attempting to determine when and where target subjects meet. Although visual depiction of multiple routes can be achieved by simply plotting the routes on a common map, such a visual depiction does not help regarding the question of whether target subjects have met. For example, three subjects may pass by the same point at three very different times. Although such information can be helpful, a simple plot of routes will not resolve the ambiguity of whether the subjects passed the point at the same time. The graphic slider and activate-route-point features described herein can be used to address such ambiguities and clearly visualize the actual locations of multiple target subjects.

When working on a case, police or intelligence investigators typically need to analyze huge amounts of data in a short period of time. The data can include geographical information of various subjects such as the location information described herein. When analyzing such information, it is not only the geographical location information itself that is important, but also the chronological relationship to the geographical location information or even the geographical-temporal relationships between different subjects and their routes on a map at a specific time frame.

Visualizing such information as described herein can allow investigators to easily identify specific locations, points in time, time, subjects, or associated routes that are related to the investigation. As described herein, such visualizations can be based on a specific subject(s) or a location at a specific time or time frame.

The described technologies thus offer considerable improvements over conventional visualization techniques, including ones that use three-dimensional approaches.

Figure 1:
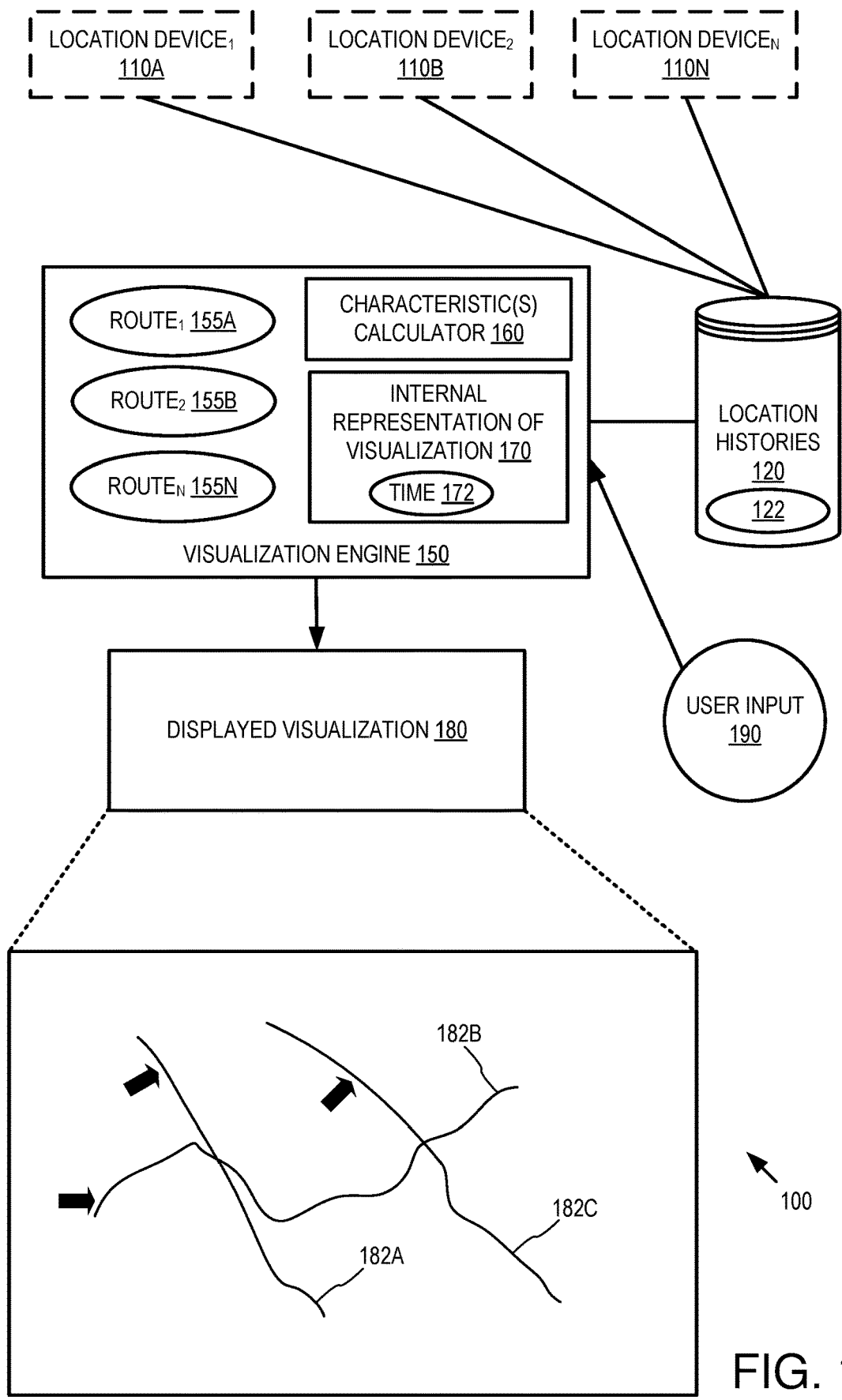
FIG. 1 is a block diagram of an example system implementing visualization of a plurality of routes for a plurality of target subjects.

Example 2—Example Overall System Implementing Visualization of a Plurality of Routes FIG. 1 is a block diagram of an example overall system 100 implementing visualization of a plurality of routes for a plurality of target subjects. In the example, the system 100 can include a plurality of location devices 110A-N configured to record locations of target subjects as described herein.

The location data can eventually make its way to a storage 120 of location histories that comprises a location record 122 that indicates a geographical location of a particular target subject at a particular time. In practice, a plurality of such location records are used to represent geographical locations and respective timestamps for a plurality of target subjects, and the records serve as input for the visualization engine 150.

The visualization engine 150 can accept the location histories storage 120 or location records as input and generate routes 155A-N for respective of the target subjects. A characteristic metric calculator 160 can be included to calculate metrics of one or more characteristics for the location histories 120, location records, or routes 155A-N.

The visualization engine can maintain an internal representation 170 of the visualization. Such an internal representation 170 can include a being-depicted (or "current") time 172 depicted by the visualization (e.g., a particular point in time such as 17:34:34 3 Dec. 2017; t+5 minutes 32 seconds, or the like) and the locations of the target subjects at such being-depicted time.

The internal representation 170 can be used to generate the displayed visualization 180, which comprises depictions of a plurality of routes 182A-C and the contemporaneous locations of the target subjects on the routes 182A-C. In other words, the visualization 180 shows where the multiple target subjects are on their depicted routes at a particular single point in time as well as the routes traveled by the target subjects over time. In any of the examples herein, the visualization 180 can also be called an "interactive chart" because it supports interactivity with a user as described herein.

User input 190 can be received by the visualization engine 150, and the visualization 180 can be modified accordingly. As described herein, mechanisms for accepting user input 190 can include a graphical slider depicted with the visualization, activation of a point on a route in the visualization, and the like. Thus, user interactivity is supported.

Further, the visualization 180 can incorporate a variety of one or more further features described herein, such as graphical depictions of metrics of the location data, extents of location data for routes, and the like.

An output device can be configured to display, via a user interface, the displayed visualization 180 in the form of an interactive chart as described herein.

In practice, the systems shown herein, such as system 100, can vary in complexity, with additional functionality, more complex components, and the like. For example, there can be additional functionality within the visualization engine 150. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the location histories, location records, routes, internal representations of the visualizations, being-depicted time, and the like can be stored in one or more computer-readable storage media or computer-readable storage devices. The technologies described herein can be generic to the specifics of operating systems or hardware and can be applied in any variety of environments to take advantage of the described features.

Figure 2:
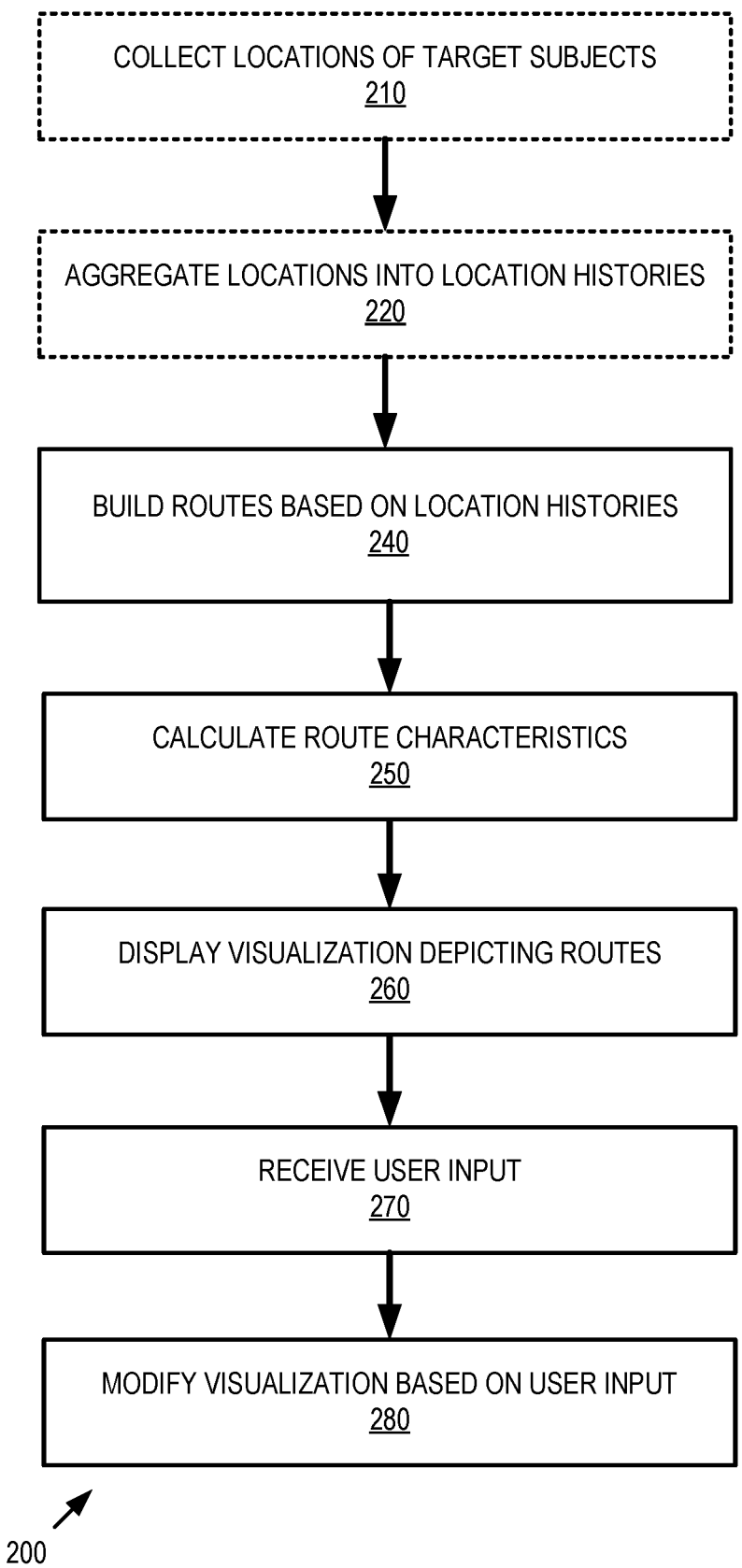
FIG. 2 is a flowchart of an example method of displaying a visualization of a plurality of routes for a plurality of target subjects.

Example 3—Example Overall Method Implementing Visualization of a Plurality of Routes FIG. 2 is a flowchart of an example overall method 200 of implementing visualization of a plurality of routes for a plurality of target subjects and can be performed, for example, by the system of FIG. 1. The visualization engine 150 of FIG. 1 can perform 240-280.

In the example, at 210, locations of target subjects are collected and stored. For example, data from a variety of sources, including location devices, can be collected as described herein.

At 220, such locations can be aggregated into location histories. For example, a collection of location records indicating a target subject (e.g., by identifier), a geographical location (e.g., x, y position; latitude, longitude location; or the like), and a timestamp can be assembled and stored.

At 240, a plurality of routes can be built based on the location records for respective of the target subjects (e.g., one route per subject). Such routes can be internally represented as a two-dimensional path over a geographical area. Depending on the quality and quantity of location data, some interpolation may need to be performed. In practice, such routes are eventually depicted on a two-dimensional display and may be limited to a specified resolution (e.g., in geographical and/or pixel terms).

At 250, route characteristics can be calculated. As described herein, such characteristics can include location data quality, velocity of movement, separation from other target subjects, or the like.

At 260, a visualization depicting the routes is generated and displayed. Such a visualization can support a variety of features such as zooming, repositioning, and the like.

At 270, user input is received. As described herein, such user input can include graphical slider manipulation, activation of a point on a route, and the like.

At 280, the visualization is modified based on the user input. In other words, a new visualization is generated and displayed. In practice, some portions of the visualization (e.g., the routes) may appear to be stationary, while other parts (e.g., the being-depicted locations of target subjects) may change (e.g., move). For example, if a new time is indicated, the locations depicted in the visualization can be moved based on the location records.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example Location Devices

In any of the examples herein, a location device can be any device that is operable to determine a current position of a target subject. In practice, such devices periodically determine a current position of the target subject, so a current position and timestamp can be recorded. Given such data, a route of the device can be determined.

The device can be one that accompanies the target subject. For example, a computer, smart phone, tablet, watch, other wearable device, or the like can record locations by using a variety of techniques. Such devices can also be built into a vehicle (e.g., navigational aids, emergency locators, or the like). GPS, Wi-Fi location services, wireless telephone tower signal strength, or the like can be used to determine location.

In some cases, the location device may be stationary but still determine the current position of a target subject by monitoring a device that accompanies the target subject, such as a wireless transmitter (e.g., smart phone, wireless beacon, or the like). For example, triangulation or other intersection methods can be used.

The actual path that such data takes can vary. For example, the data can be collected at the device accompanying the target subject, a stationary device, or both. In any event, the data can be stored and/or aggregated into a location history storage as location records that can then be used to build the routes and provide the visualizations described herein.

Although the surface of the Earth is curved and has different altitudes and buildings, the maps herein can be represented as two-dimensional surfaces for purposes of the visualization.

Example 5—Example Input Location Records

In any of the examples herein, input location data for displaying the visualization can take the form of a plurality of input location records. Such records can be aggregated by target subject. A location record can indicate a geographical location (e.g., on a two-dimensional surface) at a particular time stamp. As described herein, such records can be combined to determine a route.

In practice, a user can specify a time period filter and/or a subject identity filter, and the visualization can be based on those input location records meeting the specified criteria of the filter.

Example 6—Example Target Subjects

In any of the examples herein, a target subject can be any human target (e.g., an individual person) or subject for which location data is available. In practice, location data is actually collected via a device accompanying the subject. Data from multiple devices can be aggregated (e.g., for a person with a wearable device and traveling in a car accessing location services). Such subjects can be considered "monitored" because their location data is being collected. However, such monitoring may not have been intended at the time the data is collected.

Although some examples are particularly helpful in an e-forensic context, the technologies can be applied to other contexts as well. Similarly, although the focus is on human subjects, the technologies can also be applied to other targets (e.g., animals, vehicles, or the like).

In practice, a target subject can be represented internally with a target subject identifier. Human-readable labels can be included as desired.

Example 7—Example Map in Visualization

In any of the examples herein, a map of the visualization can be portrayed as a two-dimensional surface on which are placed routes and current geographical locations of the target subjects. In practice, a mathematical transformation can be used to transform geographical location into screen (e.g., pixel) location within the visualization (and vice-versa when receiving an activation of a location on the map). The map can be shown to scale, or logical representations (e.g., neighborhoods, streets, municipalities) can be used.

Location data can be stored in terms of geographical location, displayed map location, or some arbitrary scale, whether in absolute or relative terms. Zooming and panning functionality can be supported, and the mathematical transformation can be adjusted accordingly.

Example 8—Example being-Depicted Time

In any of the examples herein, a being-depicted time can take the form of a point in time. In practice, resolution can be at different levels of granularity (e.g., to the second, to the half-minute, to the minute, or the like). The being-depicted time indicates the time being depicted in the visualization. As described herein, the being-depicted time can be modified by a user by moving a graphical slider, activating a point on a route, or the like.

To determine the actual position to be depicted on the route (e.g., a point on the route), the nearest time record can be chosen, interpolation between or among location records can be used, or the like. Routes can be represented using a continuous technique so that a position for any arbitrary time can be calculated. Alternatively, interpolation can be done based on one or more nearest location records (e.g., the timestamp on the location record for the target subject in question).

In some cases, the quality of the time data may vary so that interpolation leads to better or worse accuracy in recreating the exact location.

Example 9—Example Route Depiction

In any of the examples herein, a route can be depicted as a two-dimensional representation (e.g., a continuous or semi-continuous line) of a plurality of geographical locations observed for a target subject over time. Such locations can be connected into a route. Such routes depict respective time series (e.g., time-ordered sequences) of geographical locations traveled by the target subjects according to geographical location records. In practice, the altitude of the subject may vary, but it need not be depicted in the route. Instead, the route represents a location on the ground or in a building.

Routes can be differentiated by using different colors, line types (e.g., dash styles), and the like.

The crossing of two routes typically indicates that two target subjects were at the same place, but possibly at different times. Using the technologies described herein, it can be more easily determined whether the two target subjects were actually at the same place at the same time (e.g., indicating that the subjects had an opportunity to meet).

Example 10—Example System Employing Graphical Slider

Figure 3:
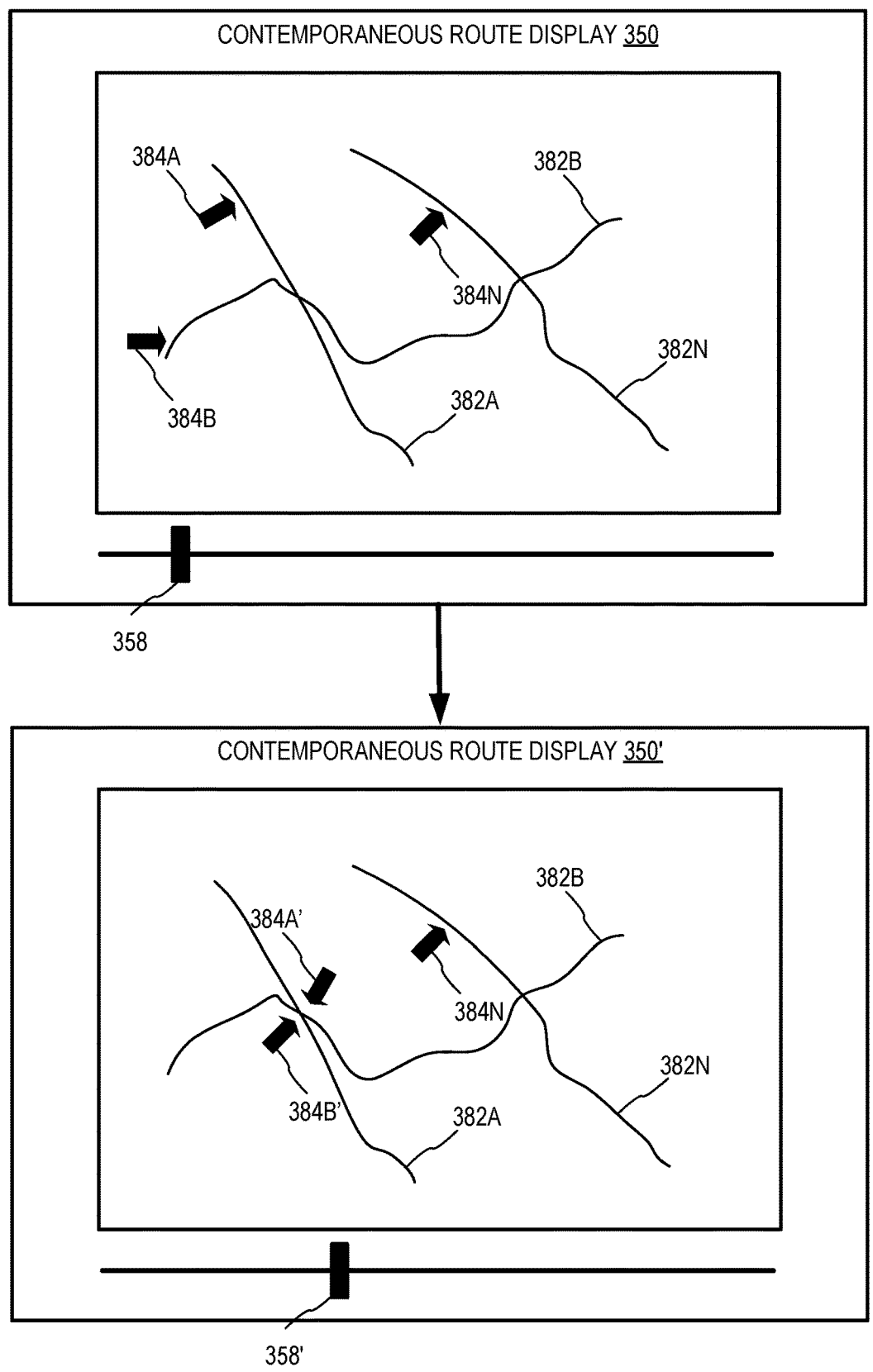
FIG. 3 is a block diagram showing example screen shots of a system employing a graphical slider to move to a different point of time in a visualization of a plurality of routes for a plurality of target subjects.

FIG. 3 is a block diagram showing example screen shots 300 of a system employing a graphical slider to move to a different point of time in a visualization of a plurality of routes for a plurality of target subjects. Such a system can include the visualization engine visualization engine 150 as shown in FIG. 1.

In the example, a visualization 350 of a plurality of location records indicating geographical locations for a plurality of target subjects is displayed. A plurality of routes 382A-N traveled by the target subjects is visually depicted.

The visualization also visually depicts contemporaneous locations (e.g., pointed to by 384A-N) of the target subjects at a first point in time (the being-depicted time for the visualization 350).

As shown, a graphical slider 358 can be displayed as part of the visualization 350. The slider 358 can be positioned (e.g., displayed) along an axis to indicate a being-depicted time (e.g., the position of the slider on the axis indicates the time in that earlier times are on one end of the axis, and later times are at the other end of the axis).

Movement of the slider 358 (e.g., to position 358') can move the visualization to a different (e.g., later or earlier) point in time. So, user input in the form of movement of the slider can cause the visualization engine to recalculate the contemporaneous locations 384A-N and show (e.g., display) the new locations 384A-N' on a modified visualization 350'.

Alternatively, the slider can be positioned horizontally (e.g., later times are to the bottom).

The described calculation and display actions can be performed responsive to detecting activation (e.g., movement) of the slider 358. A processor can be configured to perform such actions.

Example 11—Example Method of Employing Graphical Slider in Visualization

Figure 4:
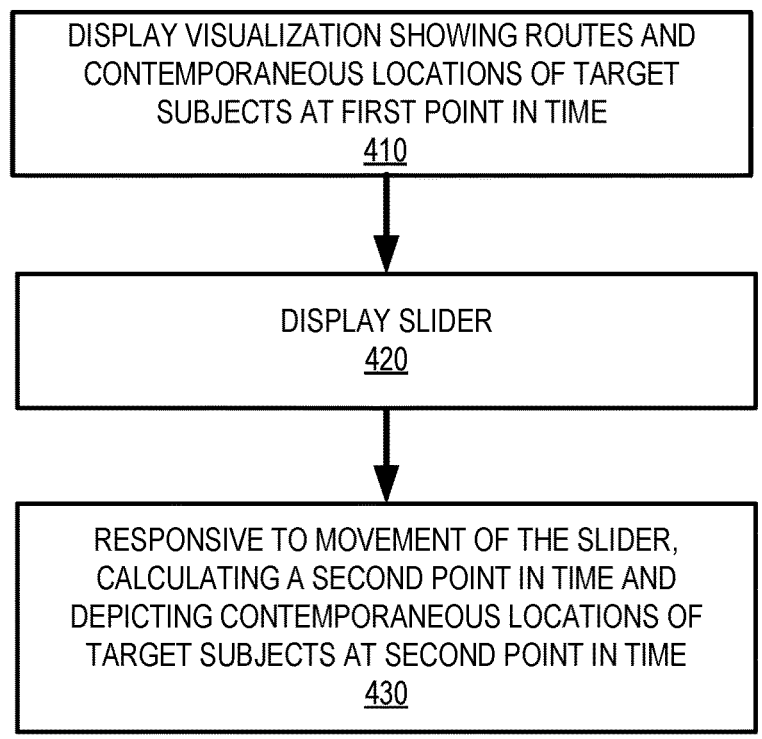
FIG. 4 is a flowchart of an example method of employing a graphical slider to move to a different point of time in a visualization of a plurality of routes for a plurality of target subjects.

FIG. 4 is a flowchart of an example method 400 of employing a graphical slider in a visualization to move to a different point of time in a visualization of a plurality of routes for a plurality of target subjects and can be implemented, for example, to present the visualizations of FIG. 3 (e.g., by a visualization engine, such as visualization engine 150).

In the example, a visualization of input location records is generated as described herein. At 410, a visualization of location information is displayed for a plurality of location records indicating geographical locations for a plurality of target subjects. As described herein, the visualization can visually depict a plurality of routes traveled by the target subjects.

The visualization can also visually depict (e.g., indicate) contemporaneous locations of the target subjects at a first point in time (e.g., a being-depicted time).

At 420, a graphical slider is displayed with (e.g., part of, proximate to, bordering, or the like) the visualization. The slider can be positioned (e.g., displayed) on a scale (e.g., representing a beginning time and an ending time). Slider input (e.g., input from a user) is received indicating a second, new point in time.

At 430, responsive to movement of the graphical slider, a second point of time is calculated (e.g., based on position of the slider on its scale), and the contemporaneous locations of the target subjects at the second point in time is depicted on a modified version of the visualization. For example, geographical locations of the subjects indicated in the input location records at the second point of time are determined, and the visualization is modified so that the indicated contemporaneous locations on the map of the visualization move to locations on the map corresponding to the determined contemporaneous locations at the second point of time.

Example 12—Example Slider

In any of the examples herein, a graphical slider can take the form of a user interface element that can be moved (e.g., by a handle) by user input that is translated into a value for incorporation into the visualization. As described herein, the axis of the slider can start at a beginning time and end an ending time. Such an axis can be linear, and other functionality can be supported (e.g., continuing to drag the slider beyond its displayed bounds can move further in time in the direction in which it is being dragged).

As described herein, a slider can provide a useful way of moving to a different point in time for the visualization (e.g., the "being-depicted time"). Some examples also show additional information displayed proximate the slider so that a user can see such information (e.g., in the context of time) without interfering with the map of the visualization.

Example 13—Example being-Depicted Location

In any of the examples herein, a target subject can be at a particular location (e.g., point) on a route at the being-depicted time. Such a location is sometimes called a "current" location because the target subject is currently at the location in the visualization when the current time is the being-depicted time. In other words, the visualization depicts the target subject via the being-depicted location because it shows where on the map the target subject is.

In some cases, location data may not be available for a target subject at the being-depicted time (e.g., the target subject has traveled off the map, the device is inoperative or unavailable, etc.). In such a case, an indication or depiction of where on the route the target subject is can be omitted (e.g., the target subject disappears from the visualization). Alternatively, an end of the route can be used (e.g., with a special indication such as faded to indicate that the target subject went off the route at the indicated end). The route can also simply be not depicted when it is determined that there is no location information.

In any of the examples herein, the visual indication of a being-depicted location (e.g., the "current" location) of a target subject can take a variety of forms. As described herein, a plurality of locations can be displayed simultaneously to visualize contemporaneous locations for target subjects (e.g., on depicted routes). Examples of indication of a location include using an arrow or other graphical device to point to a location (e.g., point) on a route, placing a dot, circle, or other shape on the route at a point on a route, depicting a point in a different color, flashing the location, or the like.

Depicting the contemporaneous locations of the target subjects can comprise visually indicating points on respective of the visually depicted routes (e.g., the routes are displayed with respective graphical indicators). In practice, different indications can be used for different routes (e.g., different colors, different colored indicators or arrows, different shapes, or the like) in a contemporaneous location scenario, where multiple positions for a single point in time are depicted.

In any of the examples, it can be explicitly depicted in the visualization whether two given monitored subjects are at a same geographical location at the same time. For example, two current locations can be indicated as proximate each other at the being-depicted time. If desired, a special user interface feature can highlight the fact that two locations are within a threshold distance of each other (e.g., by flashing the user interface elements or the like).

Figure 5:
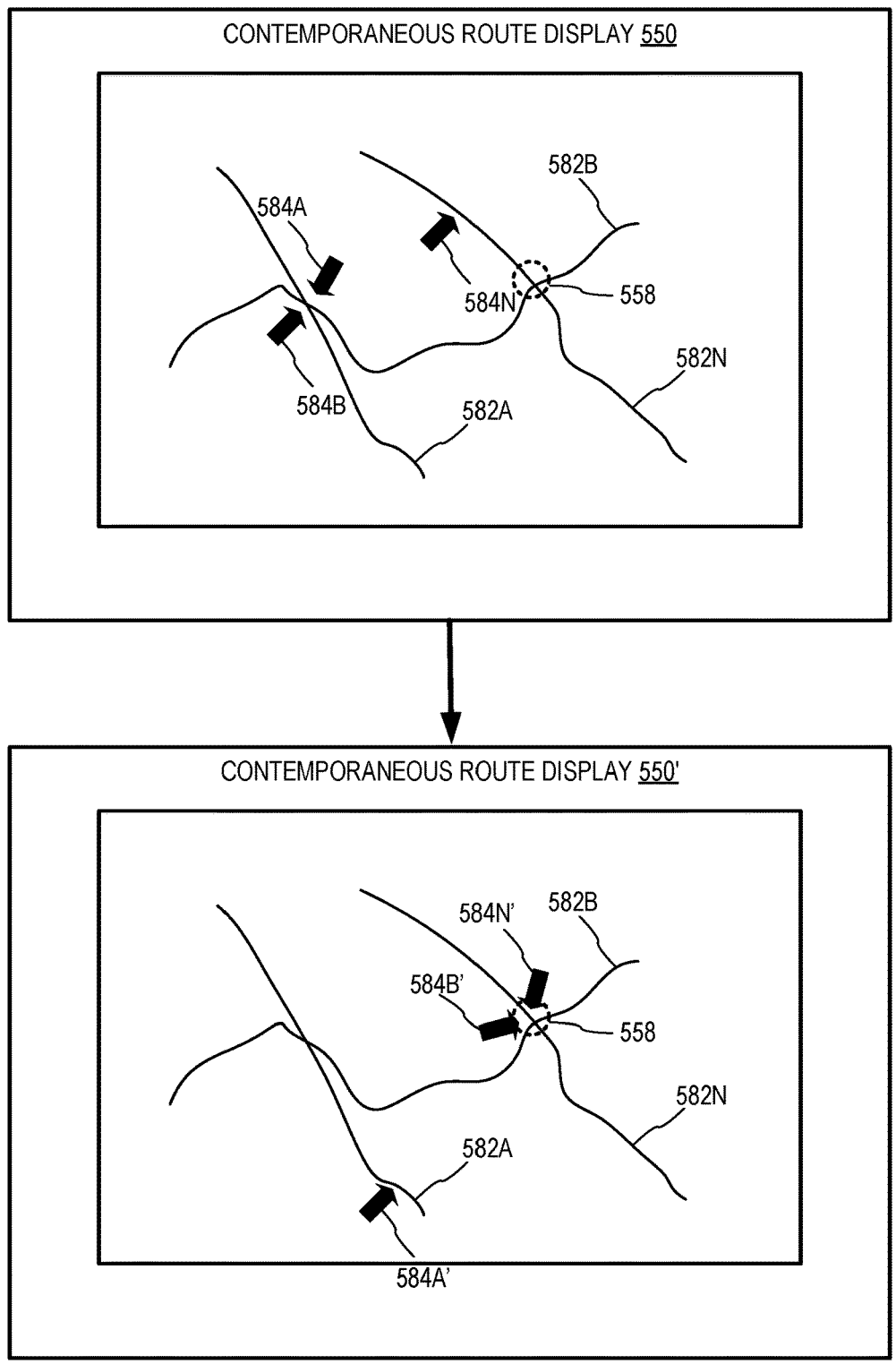
FIG. 5 is a block diagram showing example screen shots of a system employing activation of a route location in a visualization to move to a different point of time in a visualization of a plurality of routes for a plurality of target subjects.

Example 14—Example System Employing Activation of a Route Location in a Visualization FIG. 5 is a block diagram showing example screen shots of a system 500 employing activation of a route location in a visualization to move to a different point of time in a visualization of a plurality of routes for a plurality of target subjects. Such a system can include the visualization engine 150 as shown in FIG. 1.

In the example, a visualization 550 of a plurality of location records indicating geographical locations for a plurality of target subjects is displayed. A plurality of routes 582A-N traveled by the target subjects is visually depicted.

The visualization 550 also visually depicts contemporaneous locations (e.g., pointed to by 584A-N) of the target subjects at a first point in time (the being-depicted time for the visualization 550).

The visualization 550 is configured to receive an activation 558 of a particular location (e.g., point) on a given one of the plurality of routes. Thus, user input is received to modify the visualization 550.

Responsive to activation of the particular location, a second point in time can be determined (e.g., the point in time at which a target subject was at the particular location according to the location records). The visualization 550 is moved to the second, different (e.g., later or earlier) point in time. So, activation of a particular location can cause the visualization engine to recalculate the contemporaneous locations 584A-N (at the second point in time) and show the new locations 584A-N' on a modified visualization 550'.

Such an arrangement can be helpful because it is possible to select a point in time without explicitly knowing what the point in time is. Instead, a time is indicated geographically (e.g., "navigate to the point in time at which the target subject was 'here' on the route"). Thus, extensive searching by progressing linearly or otherwise in time through the location data can be avoided, and instead an immediate answer to the question of "Where were the other target subjects when target subject X was at this location" can be found.

In addition to the visualization shown, a being-depicted time can also be shown (e.g., with a slider, as text, or the like). The being-depicted time can be updated along with the locations 584A-N.

Example 15—Example Applications

The progression shown in the example 500 can be helpful in an e-forensic context because it shows a dual rendezvous. First, the target subjects associated with routes 582A and 582B (subject A and subject B) had an opportunity meet. Subsequently, the target subjects associated with routes 582B and 582N (subject B and subject N) had an opportunity to meet. Such a scenario is consistent with facts that A passed an object to B who then passed the object to N (e.g., B was a middleman). A wide variety of other scenarios can also be depicted in the visualizations. Attempting to detect such scenarios by navigating through location information without the technologies described herein may not be possible, especially if a large amount of location information is available and there is a limited amount of time for analysis.

Example 16—Example Applications in E-Forensics Context

In any of the examples herein, the location data can be that of a crime scene. Investigators can use the technologies described herein to navigate through time to find the location of various actors (e.g., target subjects) in and around the crime scheme. The technologies described herein can provide a convenient user interface to set filter criteria (e.g., time by moving the slider, location by setting the focus on the crime scene and adjusting the zoom level, and the like) for the vast amount of location data collected over the time of interest.

Because validating numerous routes against a range of locations can be computationally costly, in-memory database technology can be used to do the intense processing. For example, the SAP HANA database system can be used to determine those routes and/or actors that actually appear within the zoomed area. Other routes and/or actors can be de-prioritized or not processed at all. Such an approach allows the number of routes and/or actors being actively considered and displayed to be reduced, thus reducing the computational effort for routes and/or actors not of interest (e.g., those routes not crossing the crime scene and/or those actors not present in the crime scene). At the same time, investigators can focus on a reduced number of potential suspects.

Thus, the technical advantages of using in-memory database technology can lead to faster processing. In addition to the filtering aspects, fast aggregations and analytics can be performed on large collections of location data. Such an approach can be performed between the persisted location histories 120 and the visualization engine 150 of FIG. 1. While general persistence can achieve storing collected big data, the in-memory layer can focus on fast analytics.

Example 17—Example Method Employing Activation of a Route Location

Figure 6:
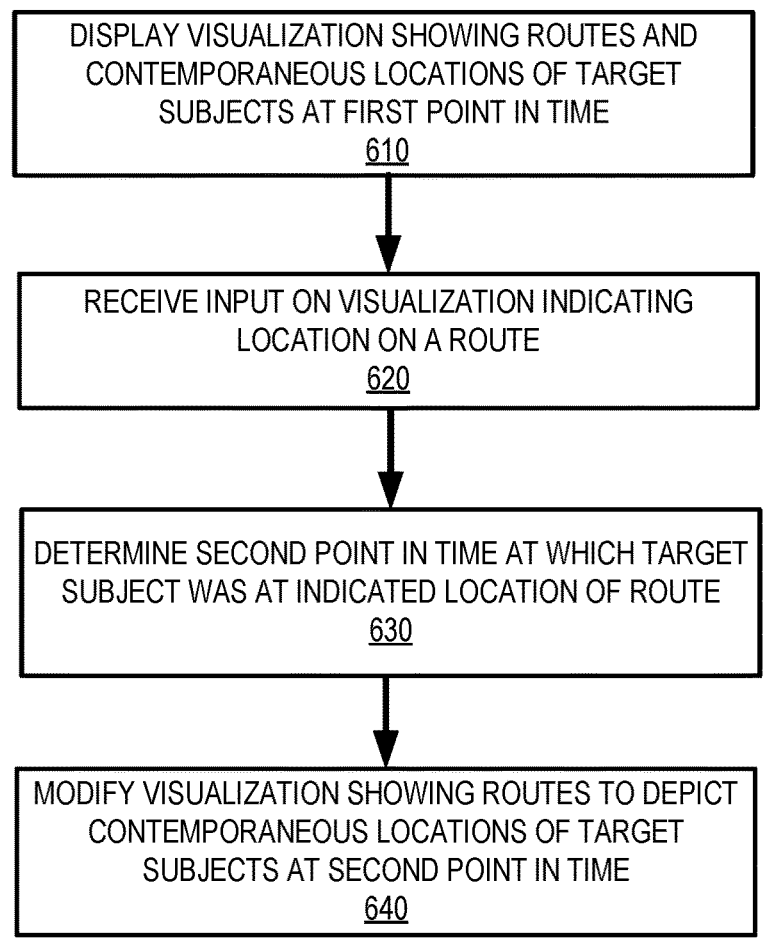
FIG. 6 is a flowchart of an example method of employing activation of a route location to move to a different point of time in a visualization of a plurality of routes for a plurality of target subjects.

FIG. 6 is a flowchart of an example method 600 of employing activation of a route location to move to a different point of time in a visualization of a plurality of routes for a plurality of target subjects and can be implemented, for example, to present the visualizations of FIG. 5 (e.g., by a visualization engine, such as visualization engine 150).

In the example, a visualization of input location records is generated as described herein. At 610, a visualization of location information is displayed for a plurality of location records indicating geographical locations for a plurality of target subjects. As described herein, the visualization can visually depict a plurality of routes traveled by the target subjects.

The visualization can also visually depict (e.g., indicate) contemporaneous locations of the target subjects at a first point in time (e.g., a being-depicted time for the visualization).

At 620, activation of a particular location on a given one of the plurality of routes is received. User input on (e.g., via) the visualization indicating a location on a route is received.

At 630, responsive to activation of the particular location of the given one of the plurality of routes, a second point in time at which a target subject (e.g., associated with the route) was at the particular location of the given one of the plurality of routes is determined. In other words, it is determined when (e.g., according to the location records) the target subject was at the activated location.

At 640, further responsive to the activation, the contemporaneous locations of the target subjects at the second point of time is depicted on a modified version of the visualization.

Example 18—Example Combination of Slider with Activation-Route-Point Navigation The slider technologies shown in FIGS. 3 and 4 can be combined with the activation-route-point technologies of FIGS. 5 and 6. In such a combination, the slider can be updated to reflect the second point in time when a point on a route is activated.

Such a combination can be particularly helpful to navigate through the location data with the visualization. For example, it is possible to travel to a particular time via the slider, but also travel to a particular time by selecting a point on a route (e.g., and then subsequently browsing the data immediately before and after the time associated with the point on the route).

The synergies between the two technologies can allow discovery of scenarios that are not possible given limited time resources to analyze the location data manually.

In such combinations of the technologies, there can be three points in time: a first, original point, a second point selected by one of the technologies, and a third point in time selected by the other of the technologies. Navigation can continue accordingly to further points in time.

Example 19—Example Activation of a Point on a Route

In any of the examples herein, activation of a location or point on a route can take the form of a click action (e.g., click, right-click, double-click, or the like), tap action (e.g., tap, tap-and-hold, or the like), or touch action (e.g., touch, touch-and-hold, or the like), or the like located at the location or point. Such an activation can be prefaced by selecting a menu item, graphical button, or shortcut key. In practice, for activations that are not exactly on a route, the user interface can account for small errors in location by using the nearest point on a route.

If an intersection of two routes is selected, various approaches can be used to resolve which route is selected. For example, a user interface element can prompt for which route is selected.

Figure 7:
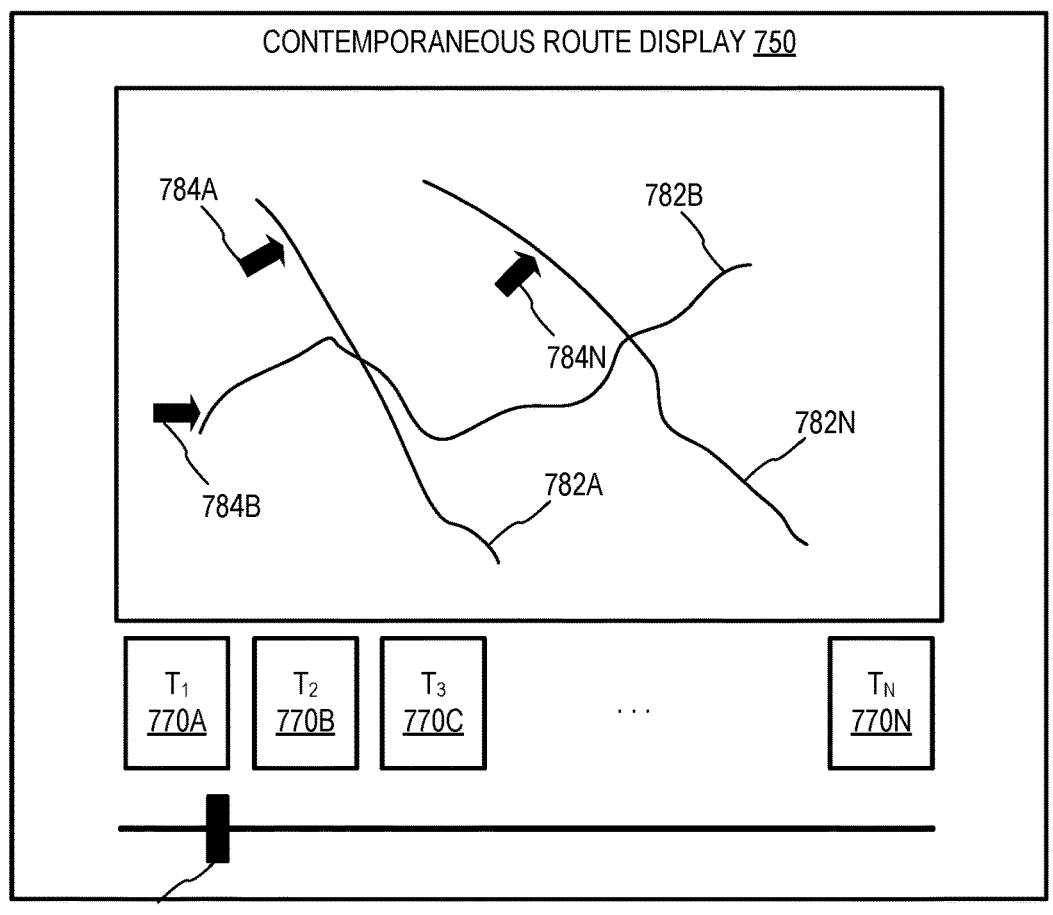
FIG. 7 is a screen shot of an example visualization including graphical depictions of characteristic metrics across time.

Example 20—Example Visualization with Graphical Depictions of Metrics of Location Data Across Time FIG. 7 is a screen shot 700 of an example visualization 750 including graphical depictions 770A-N of characteristic metrics of location data across time and can be presented in any of the visualizations described herein (e.g., by a visualization engine such as the visualization engine 150 of FIG. 1).

As in some of the other examples, the example shows a plurality of routes 782A-N and contemporaneous locations (pointed to by 784A-N) on the routes for a plurality of target subjects. A graphical slider 758 positioned on a time axis can also be shown. The slider 758 graphically depicts the being-depicted time of the contemporaneous locations.

In addition, the visualization 750 includes graphical depictions 770A-N of characteristic metrics of the location data (e.g., the location histories, location records, or routes) across time. Such graphical depictions can depict metrics for a characteristic of the location data across time. For example, a metric such as location data quality, travel velocity of a target subject, separation of an subject from other subjects, and the like can be depicted. Such metrics can be calculated for a particular point in time (e.g., a snapshot), over a time window, sampled within a window, averaged over a window, or the like.

As shown, the graphical depictions 770A-N can be recurring over the time span (e.g., they are periodically calculated), and they can be shown proximate to the time axis of the slider 758. Thus, the depictions 770A-N can represent respective points or windows in time $T_1$-$T_n$.

In other words, if the quality of location data for a particular route is low at the beginning of the time axis, the depiction 770A can include a graphical element (e.g., bar) so indicating low quality. If the quality of the location data improves over time, subsequent depictions (e.g., 770B-N) can include a graphical element indicating a higher quality.

Such graphical depictions provide yet another technology to assist a reviewer who is navigating the location data. Another variable can be depicted in the visualization 750 without detracting from the visual depiction of the routes or the current (being-depicted) location of the target subjects.

Such data can be helpful in determining confidence of the depiction, zeroing in on interesting scenarios (e.g., a waiting subject, a quickly moving subject, or the like), and other insights into the location data that otherwise are not discernable. By juxtaposing such graphical depictions of characteristic metrics across time on the visualization, greater efficiencies can be achieved.

Example 21—Example Graphical Depictions of Metrics of Location Data Across Time

Figure 8A:
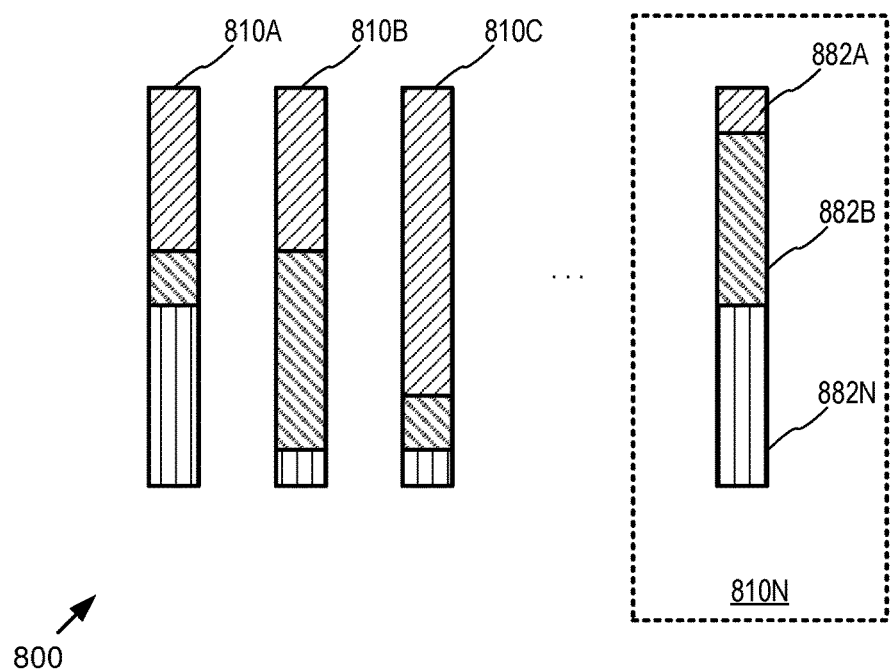
FIGS. 8A-B are diagrams showing two examples graphical depictions of metrics across time.
Figure 8B:
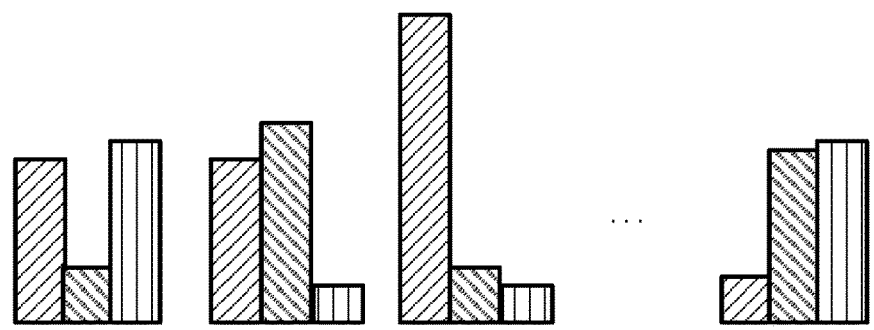

FIGS. 8A-B are diagrams showing two example graphical depictions 800, 850 of characteristic metrics of location data across time that can be presented by any of the systems described herein. For example, the visualization 750 of FIG. 7 can incorporate the bar graphs 810A-C as the depictions 770A-N.

In the first example, the characteristic metrics are depicted graphically by a bar graph (e.g., 810A-N) in which the bars (e.g., 882A-N) are stacked on top of each other using a common scale. Alternatively, the bars can be stacked horizontally.

In the second example 850, the characteristic metrics are depicted graphically by bar graphs in which the bars are stacked next to each other using a common scale.

The bars (e.g., 882A-N) can be color-coded to match the routes with which they are associated, or some other coding method can be used.

As shown in FIG. 7, the depictions can be shown proximate a slider or other time axis. The depictions can also be called "bar charts."

Figure 9:
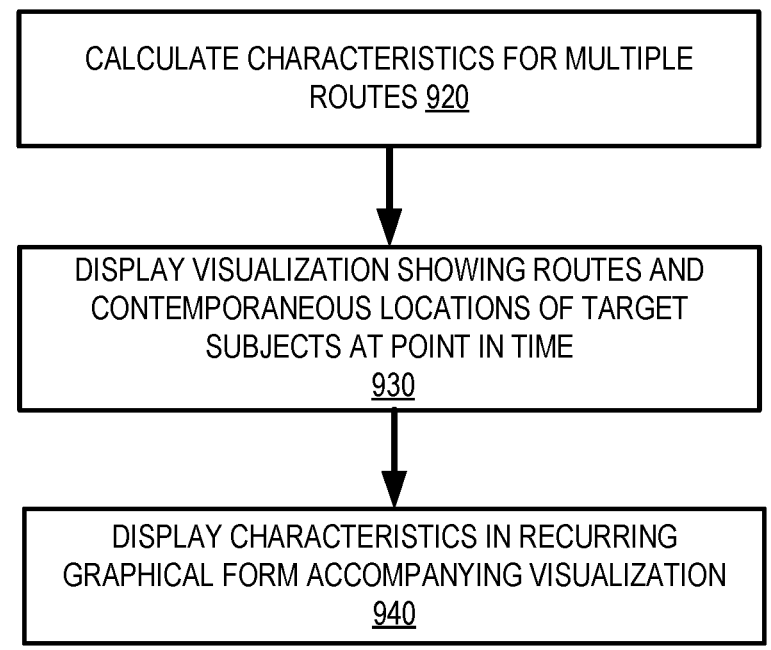
FIG. 9 is a flowchart of an example method of displaying metrics of characteristics in graphical form.

Example 22—Example Method of Generating Metrics of Characteristics of Location Data in Graphical Form FIG. 9 is a flowchart of an example method 900 of generating and displaying metrics of characteristics of location data in graphical form and can be used in any of the visualization examples herein and can be performed by a visualization engine, such as that shown in FIG. 1.

At 920, characteristic metrics for a plurality of routes are calculated. For example, a single characteristic metric for a plurality of target subjects can be calculated, based on the location data (e.g., location histories, location records, or routes) associated with the target subjects. Multiple (e.g., different) characteristic metrics can also be calculated by repeating the process.

In some cases, a calculation for a single path may involve data from a plurality of target subjects (e.g., determining separation between two subjects).

At 930, a visualization showing the routes and contemporaneous locations of target subjects at a point in time can be displayed.

At 940, the characteristic metrics can be displayed in recurring graphical from with the visualization. Graphical depictions of the metrics can be shown proximate a graphical slider. The graphical depictions can be recurrently displayed over an axis of the graphical slider at positions corresponding to recurring points in time. Such positions can be selectable via movement of the graphical slider.

Figure 10:
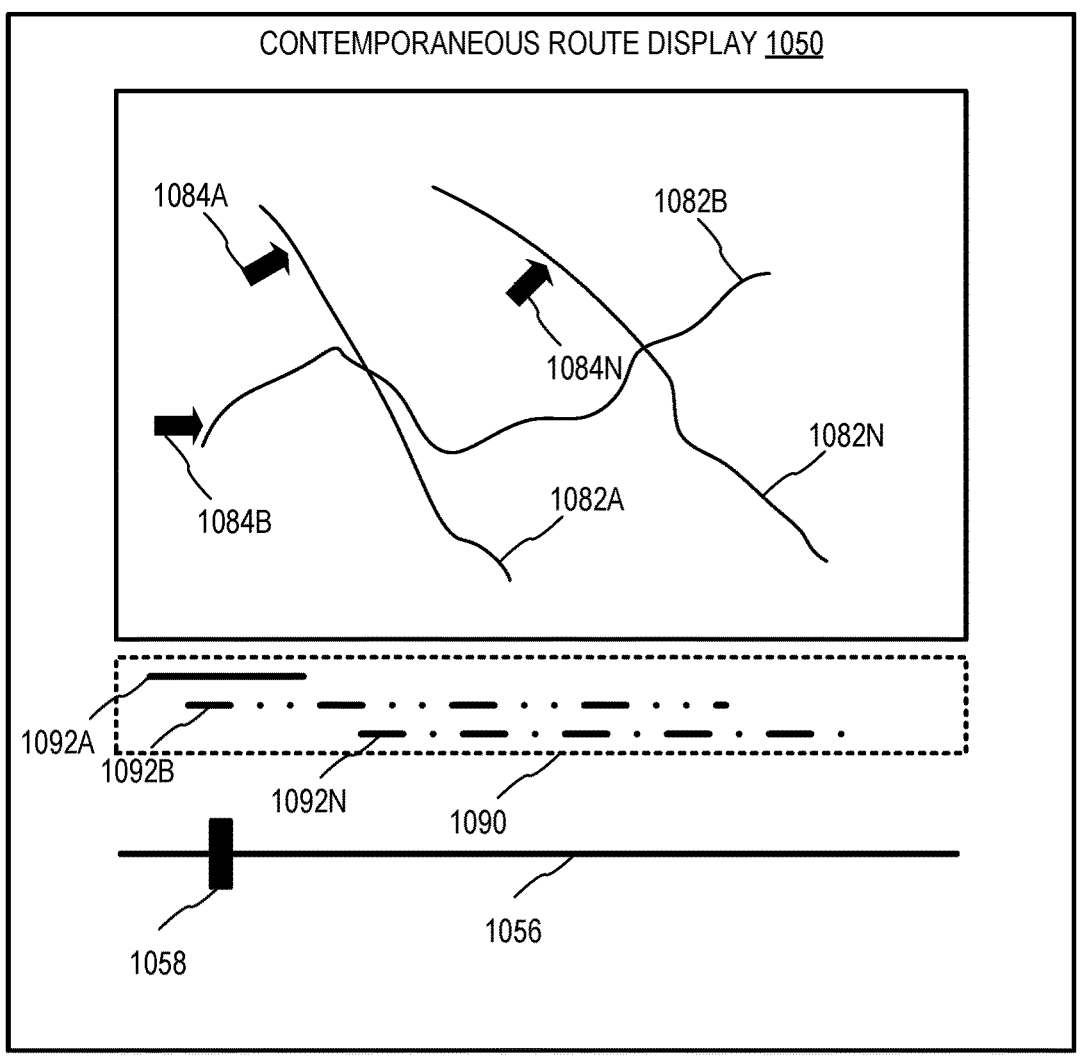
FIG. 10 is a block diagram of an example screen shot of a visualization showing time extents of location data for routes.

Example 23—Example Visualization Showing Time Extents of Location Data for Routes FIG. 10 is an example screen shot 1000 of a visualization 1050 showing time extents 1090 of location data for routes and can be implemented in any of the visualizations herein (e.g., by a visualization engine such as that shown in FIG. 1).

As in some of the other examples herein, the visualization 1000 shows a plurality of routes 1082A-N and being-depicted locations 1084A-N for a plurality of target subjects. A time axis 1056 and a graphical slider 1058 are also shown, but can be omitted.

The time extents 1090 of location data for the various routes 1082A-N can be included in the visualization 1050. In the example, a first line 1092A showing time extents for the first route 1084A, a second line 1092B showing time extents for the second route 1084B, and a third line 1092N showing time extents for the third route 1084N are shown. Thus, time extents are shown for respective of the depicted routes 1082A-N. Bars or another similar graphical device can be used in place of lines.

The time extents 1090 show the range of time over which location data is available. Such data may later become available, so it is possible to have a non-continuous line.

The lines 1092A-N can be presented proximate the slider 1058 to allow selection of a point in time at which data is available for one or more of the routes. For example, it is apparent that location data is available for the first route at the beginning of the time axis. Subsequently, location data is available for both the first and second route. Then, location data is not available for the first route, but subsequently, there is overlap between the location data for the second and the third route. Although some of the lines 1092A-N are shown as being dashed for purposes of differentiation, in practice, the lines can be solid and/or differentiated in other ways (e.g., of different colors to match the color scheme of the routes 1082A-N).

When the visualization is zoomed or panned, the extents can be updated to reflect the location data that is available for the zoomed or panned area. In other words, the extents can be limited to the location data available for the displayed area of the visualization (e.g., location data for locations outside of the displayed area is not included).

Such a visualization can be helpful to determine if the location data can indicate the possibility of a meeting (e.g., same location at the same time) between two target subjects. If location data is not available for a particular time frame, such a meeting during the time frame will not be shown or established in the visualization. Conversely, investigators can focus on those time frames where location data is available (e.g., the lines overlap), because a meeting may be shown in the visualization.

Figure 11:
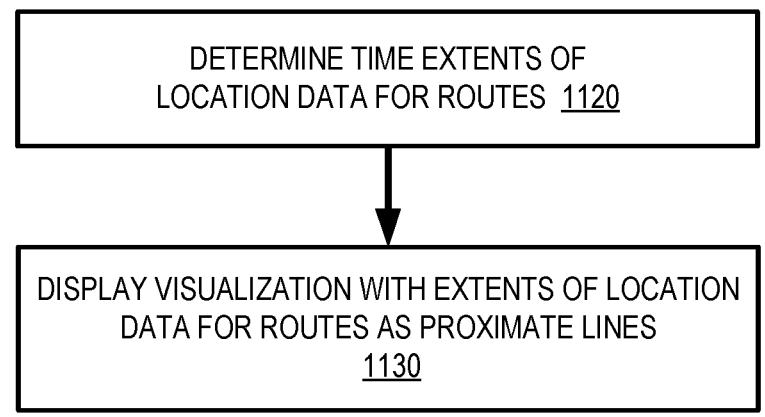
FIG. 11 is a flowchart of an example method of generating a visualization of time extents of location data for routes.

Example 24—Example Method of Generating a Visualization Showing Time Extents of Location Data for Routes FIG. 11 is a flowchart of an example method of generating a visualization showing extents of location data for routes and can be used in any of the examples herein to generate a visualization, such as that shown in FIG. 10. The method can be performed by a visualization engine such as that shown in FIG. 1.

At 1120, the time extents of location data for the plurality of routes being depicted is determined. For example, a beginning time and an ending time is found. In some cases, the data may resume being available, so there may be multiple beginning times and ending times. A threshold time value can be set to vary the sensitivity (e.g., if no data is available for over 5 minutes, the data is considered to be unavailable).

At 1130, a visualization with time extents of the location data is displayed for routes. A visual depiction of the time extents of location data availability for the plurality of routes can be displayed as part of the visualization. Such time extents can be depicted as lines or bars proximate a time axis (e.g., for a graphical slider such as the one described herein). If depicted on such an axis, the same time scale can be used when displaying the extents (e.g., if the slider is moved to a position where the extents show that data is available for a route, a current location of the target subject will be shown on the route).

Example 25—Example Depiction of Time Extents

In any of the examples herein, time extents can be depicted as lines or bars. Such lines or bars can be stacked one atop the other, shown in parallel, shown as peers, or the like. Color coding can be used to indicate for which route the time extents applies.

Although examples describe the extents in terms of routes, such extents can also be described in terms of subjects.

Example 26—Example Graphical Slider Integration

Figure 12:
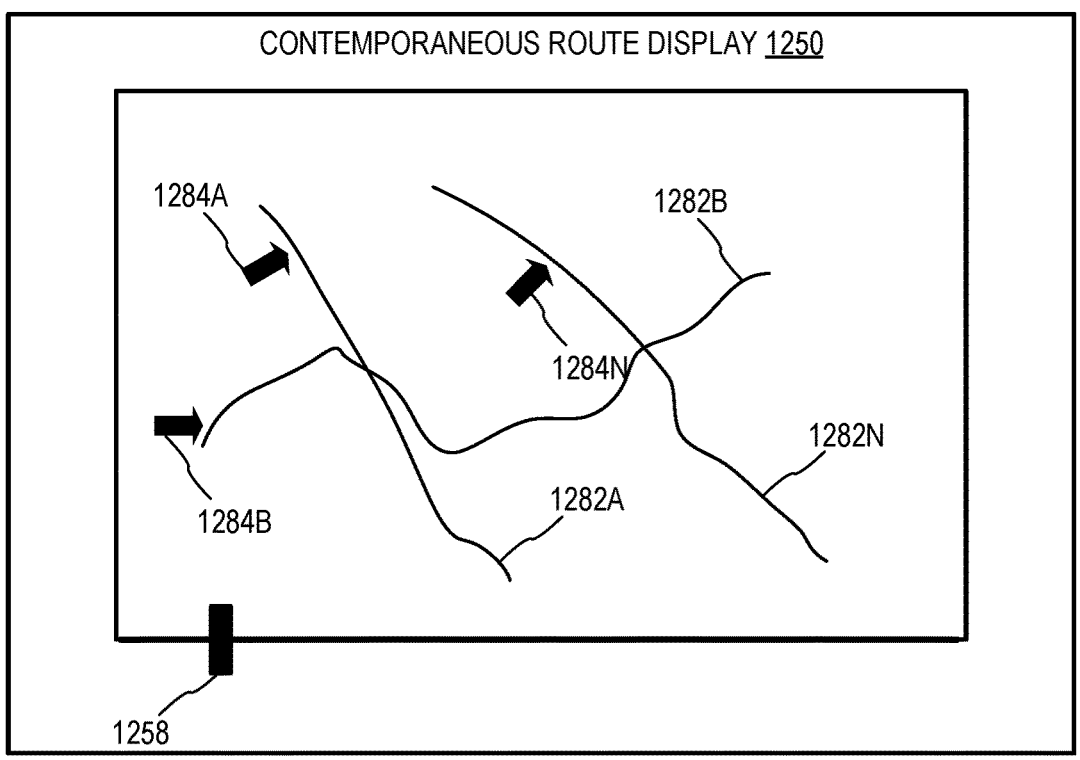
FIG. 12 is a block diagram of an example screen shot showing a graphical slider integrated into a visualization.

FIG. 12 is an example screen shot 1200 showing a graphical slider 1258 integrated into a visualization 1250 that can be used in any of the examples herein employing a graphical slider.

In the example, the slider 1258 appears as integrated into a single control (e.g., a single control represents the slider and the chart). There is no separate axis for the slider 1258. The remaining elements 1250, 1282A-N, 1284A-N can be as described elsewhere herein.

Example 27—Example Detailed Implementation

The following is a more detailed example method of implementing the technologies herein in an e-forensics context. The method can be implemented as one or more computer-readable media having encoded thereon computer-executable instructions causing one or more processors to perform the method.

For a location information indicating geographical locations for a plurality of monitored target subjects, a visualization of the location information can be displayed, wherein the visualization visually depicts a plurality of routes traveled by the monitored target subjects on a two-dimensional map and visually depicts contemporaneous geographical locations of the monitored target subjects at a first point in time.

A plurality of lines indicating time extents of location data availability for the monitored target subjects can be displayed as stacked parallel lines, wherein at least two of the lines contain portions that overlap, indicating an overlapping availability of location data at an overlapping point in time.

A graphical slider can be displayed on an axis having a same scale as the time extents of location data.

User input moving the graphical slider to a different position can be received.

Based on the user input (e.g., the new position of the slider), a second point in time can be calculated (e.g., based on where on the axis the slider was moved).

Where on the two-dimensional map the monitored target subjects were at the second point of time according to the location information can be determined, the two-dimensional map can be updated accordingly. For example, the indicated locations of the monitored target subjects can be moved to geographical locations indicated in the location information.

Example 28—Example Advantages

A number of advantages can be achieved via the technology described herein because they can display combined data in a meaningful way. For example, answers to the following can be found:

Have the subjects moved before or during a particular time (e.g., that a crime occurred)?
Where have the subjects moved?
Have the subjects met each other?
When and where did they meet?
Have the subjects explored the same location (e.g., crime scene) at different times?

As described herein, the information can be displayed as an enriched combination of a digital map, diagram, and timeline/time slider. The routes of the subjects can be displayed on the map and the time slider. Locations and time of movements of the subjects can be directly visible.

The slider can be used to change the being-depicted time. The arrows marking current locations of the subjects are adapted accordingly (to show locations at a new being-depicted time). The investigator can see the exact location of the subject in time.

A part of a route can be activated, and the being-depicted time is adapted. The investigator can easily see the location of multiple subjects based on the time/location of one subject.

Encounters can be displayed on the map. Have subjects explored the same location? Further investigation into the time when the location was explored by which subjects might help to solve the case.

Routes can be displayed in the diagram/time slider control. It is apparent if the subjects moved at the same time to perhaps coordinate a crime. Routes might give an insight into the question.

The visualization can easily show if there are any huge movements of the subjects, which might be the case immediately before the time of a crime. Such may give insights to solve the case.

The investigator can use the diagram to display various alternatives of interest (e.g., the amount of available waypoints of the subject tracking or the mileage in a specific timeframe).

The visualization can display the information using different charts (e.g., groups or stacked bar charts).

The data are easy to consume because the visualization is not based on difficult-to-consume three-dimensional diagrams.

The visualization can display multiple aspects and information of interest to an investigator to see the time, spatial location, and relationship between subjects in an easy-to-consume way.

Other visualizations often focus on displaying time as a third axis in a three-dimensional space. Such an approach quickly leads to a very confusing spaghetti graph when too many routes are displayed at the same time.

Example 29—Example Computing Systems

Figure 13:
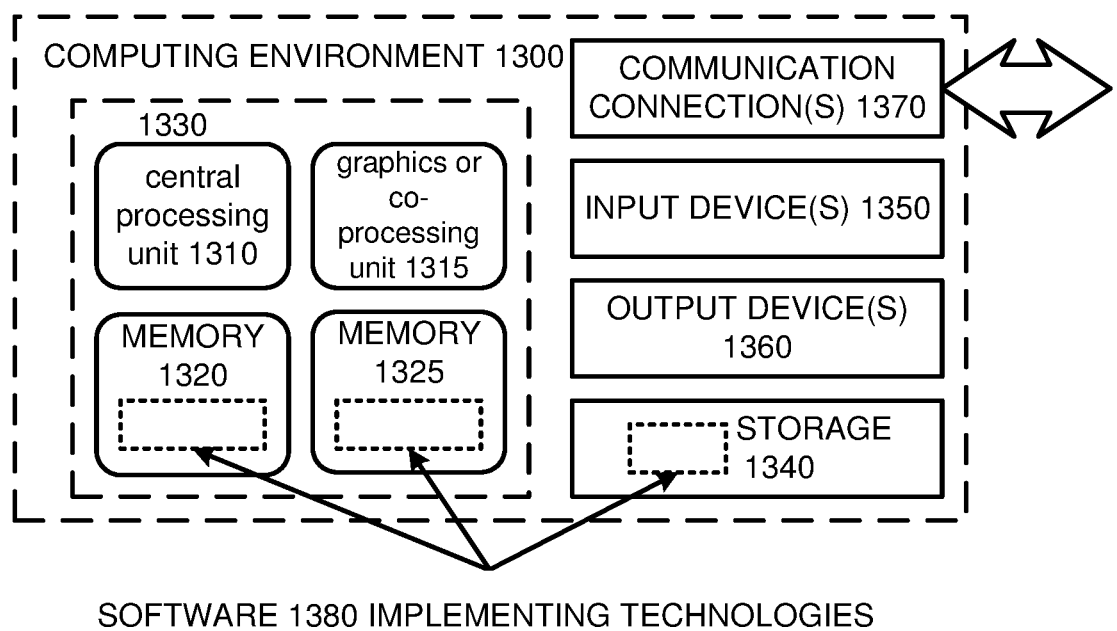
FIG. 13 is a block diagram of an example computing system in which described embodiments can be implemented.

FIG. 13 depicts an example of a suitable computing system 1300 in which the described innovations can be implemented. The computing system 1300 is not intended to suggest any limitation as to scope of use or functionality of the present disclosure, as the innovations can be implemented in diverse computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 can be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 can have additional features. For example, the computing system 1300 includes storage 1340, one or more input devices 1350, one or more output devices 1360, and one or more communication connections 1370, including input devices, output devices, and communication connections for interacting with a user. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 can be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 can be an input device such as a keyboard, mouse, pen, or trackball, a voice input device, a scanning device, touch device (e.g., touchpad, display, or the like) or another device that provides input to the computing system 1300. The output device(s) 1360 can be a display, printer, speaker, CD-writer, or another device that provides output from the computing system 1300.

A display (e.g., output device configured to display) can be any display output device such as a monitor, screen, glasses, projector, holographic display, three-dimensional imager, or the like that can present images to a user that include graphics, text, and the like.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 30—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 31—Example Cloud Computing Environment

Figure 14:
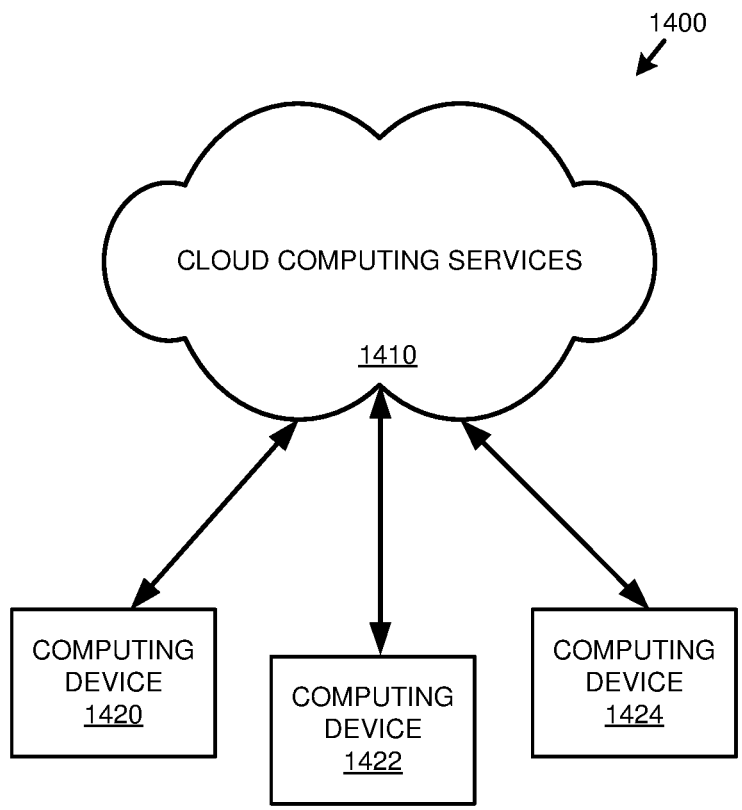
FIG. 14 is a block diagram of an example cloud computing environment that can be used in conjunction with the technologies described herein.

FIG. 14 depicts an example cloud computing environment 1400 in which the described technologies can be implemented, including, e.g., the system 100 of FIG. 1 and other systems herein. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

In practice, cloud-based, on-premises-based, or hybrid scenarios can be supported.

Example 32—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 33—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
an output device configured to display, via a user interface, an interactive chart comprising a graphical slider and a plurality of visual representations of different routes, the routes depicting respective time series of geographical locations traveled by target subjects according to a plurality of geographical location records, wherein the output device is further configured to display, for the routes, respective graphical indicators of contemporaneous locations of target subjects at a first point in time; and
a processor configured to detect activation of the graphical slider, and in response to the activation of the graphical slider, calculate a second point in time, and display the graphical indicators of the contemporaneous locations of the target subjects at the second point in time on a modified version of the interactive chart.

2. The computing system of claim 1 wherein:
displaying the contemporaneous locations of the target subjects comprises visually indicating points on respective of the visual representations of the different routes.

3. The computing system of claim 2 wherein:
visually indicating points on respective of the visual representations of the different routes comprises displaying arrows pointing to respective of the points.

4. A computer-implemented method comprising:
for a plurality of location records indicating geographical locations for a plurality of target subjects, displaying a visualization of the location records, wherein the visualization visually depicts a plurality of routes traveled by the target subjects and visually depicts contemporaneous locations of the target subjects at a first point in time;
displaying a graphical slider with the visualization; and
responsive to movement of the graphical slider, calculating a second point in time, and depicting the contemporaneous locations of the target subjects at the second point in time on a modified version of the visualization.

5. One or more non-transitory computer-readable media comprising computer-executable instructions that, when executed, cause a computing system to perform a method comprising:
for a plurality of location records indicating geographical locations for a plurality of target subjects, displaying a visualization of the location records, wherein the visualization visually depicts a plurality of routes traveled by the target subjects and visually depicts contemporaneous locations of the target subjects at a first point in time;
displaying a graphical slider with the visualization; and
responsive to movement of the graphical slider, calculating a second point in time, and depicting the contemporaneous locations of the target subjects at the second point in time on a modified version of the visualization.

6. The method of claim 4 wherein:
whether two given monitored subjects are at a same geographical location at a same time is explicitly depicted in the visualization.

7. The method of claim 4 wherein:
depicting the contemporaneous locations of the target subjects comprises visually indicating points on respective of the visually depicted routes.

8. The method of claim 7 wherein:
visually indicating points on respective of the visually depicted routes comprises displaying arrows pointing to respective of the points.

9. The method of claim 7 wherein:

a particular one of the target subjects is not on a route at the second point of time; and a depiction of a location of the particular one of the target subjects at the second point of time is omitted from the modified version of the visualization.

10. The method of claim 4 further comprising:

receiving an activation of a particular point on a given route out of the plurality of routes;

responsive to receiving the activation, determining a third point in time, wherein the third point in time corresponds to a point in time at which a target subject was at the particular point on the given route; and depicting the contemporaneous locations of the target subjects at the third point in time on a further modified version of the visualization.

11. The method of claim 4 further comprising:

calculating metrics for location information for the target subjects for a plurality of time periods; and showing graphical depictions of the metrics proximate the graphical slider.

12. The method of claim 11 wherein:

the graphical depictions of the metrics are recurrently displayed over an axis of the graphical slider at positions corresponding to recurring points of time.

13. The method of claim 12 wherein:

the positions are selectable via movement of the graphical slider.

14. The method of claim 11 wherein:

the metrics comprise location information quality for respective of the target subjects.

15. The method of claim 11 wherein:

the metrics comprise velocity for respective of the target subjects.

16. The method of claim 11 wherein:

the metrics comprise separation for respective of the target subjects.

17. The method of claim 4 further comprising:

determining time extents of location data availability for the plurality of routes; and displaying a visual depiction of the time extents of location data availability for the plurality of routes as part of the visualization.

18. The method of claim 17 further wherein:

the visual depiction of the time extents is displayed using a same time scale as that of an axis on which the graphical slider is displayed.

19. The method of claim 4 wherein:

a chart of the visualization and the graphical slider are integrated into a single user interface control.

20. One or more non-transitory computer-readable media having encoded thereon computer-executable instructions causing one or more processors to perform a method comprising:

for a location information indicating geographical locations for a plurality of monitored target subjects, displaying a visualization of the location information, wherein the visualization visually depicts a plurality of routes traveled by the monitored target subjects on a two-dimensional map and visually depicts contemporaneous geographical locations of the monitored target subjects at a first point in time;

displaying a plurality of lines indicating time extents of location data availability for the monitored target subjects as stacked parallel lines, wherein at least two of the lines contain portions that overlap, indicating an overlapping availability of location data at an overlapping point in time;

displaying a graphical slider on an axis having a same scale as the time extents of location data;

receiving user input moving the graphical slider to a different position;

based on the user input, calculating a second point in time;

determining where on the two-dimensional map the monitored target subjects were at the second point of time according to the location information; and updating the two-dimensional map accordingly.

\* \* \* \* \*